United States Patent
Marshall et al.

(10) Patent No.: US 10,845,505 B2
(45) Date of Patent: Nov. 24, 2020

(54) ANTI-STATIC, ANTI-REFLECTIVE COATING

(71) Applicant: Vision Ease, LP, Ramsey, MN (US)

(72) Inventors: Michael Marshall, Andover, MN (US); Jeff Brown, St. Louis Park, MN (US)

(73) Assignee: Vision Ease, LP, Ramsey, MN (US)

( * ) Notice: Subject to any disclaimer, the term of this patent is extended or adjusted under 35 U.S.C. 154(b) by 0 days.

(21) Appl. No.: 15/065,752

(22) Filed: Mar. 9, 2016

(65) Prior Publication Data

US 2016/0266281 A1    Sep. 15, 2016

Related U.S. Application Data

(60) Provisional application No. 62/130,502, filed on Mar. 9, 2015.

(51) Int. Cl.
*G02B 1/116* (2015.01)
*G02B 1/16* (2015.01)

(52) U.S. Cl.
CPC ............. *G02B 1/116* (2013.01); *G02B 1/16* (2015.01)

(58) Field of Classification Search
CPC .......... G02B 1/115; G02B 1/041; G02B 1/11; G02B 1/105; G02B 1/14; G02B 1/111; G02B 1/118; G02B 1/18; G02B 27/0006; G02B 1/113; G02B 5/285; G02B 1/04; G02B 1/10; G02B 5/286; G02B 15/177; G02B 1/02; G02B 2207/107; G02B 5/005
USPC ......................................... 359/359, 580–589
See application file for complete search history.

(56) References Cited

U.S. PATENT DOCUMENTS

| | | |
|---|---|---|
| 2,333,051 A | 10/1943 | Smith |
| 4,108,827 A | 8/1978 | La Liberte |
| 4,139,694 A | 2/1979 | Laliberte |
| 4,422,721 A | 12/1983 | Hahn et al. |
| 4,793,669 A | 12/1988 | Perilloux |
| 4,896,928 A | 1/1990 | Perilloux et al. |
| RE33,729 E | 10/1991 | Perilloux |
| 5,059,561 A | 10/1991 | Ciolek et al. |

(Continued)

FOREIGN PATENT DOCUMENTS

| | | | |
|---|---|---|---|
| EP | 0145201 A1 | 6/1985 | |
| EP | 2286985 A1 * | 2/2011 | ............. G02B 1/116 |

(Continued)

OTHER PUBLICATIONS

Johnson et al., Optical Constants of the Noble Metals, Physical Review B. vol. 6, No. 12. Dec. 15, 1972, Retrieved from internet: <https://www.clearrice.edu/elec603/spring2008/Selecting_a_Paperfiles/Phys%20%20Rev%20%20B%201972%20Johnson.pdf> p. 4374.

(Continued)

*Primary Examiner* — William R Alexander
*Assistant Examiner* — Sharrief I Broome
(74) *Attorney, Agent, or Firm* — Inskeep IP Group, Inc.

(57) ABSTRACT

An anti-reflective, anti-static coating, optical articles employing such a coating, and methods of forming the same. The coating formed of alternating layers of low, mid, and/or high refractive index oxide materials and one or more layers of electrically conductive, substantially non-oxide forms of the same materials employed to form the alternating layers of low, mid, and/or high refractive index oxide materials.

19 Claims, 3 Drawing Sheets

(56) References Cited

U.S. PATENT DOCUMENTS

| | | | |
|---|---|---|---|
| 5,177,509 A | 1/1993 | Johansen et al. | |
| 5,182,588 A | 1/1993 | Maurer et al. | |
| 5,371,138 A | 12/1994 | Schaefer et al. | |
| 5,400,175 A | 3/1995 | Johansen et al. | |
| 5,521,765 A | 5/1996 | Wolfe | |
| 5,719,705 A | 2/1998 | Machol | |
| 5,751,481 A | 5/1998 | Dalzell et al. | |
| 5,798,182 A | 8/1998 | LeFebvre et al. | |
| 5,922,246 A | 7/1999 | Matsushita et al. | |
| 5,949,518 A | 9/1999 | Belmares et al. | |
| 6,313,577 B1 * | 11/2001 | Kunisada | G02B 1/116 313/479 |
| 6,419,873 B1 | 7/2002 | Buazza et al. | |
| 6,464,484 B1 | 10/2002 | Powers et al. | |
| 6,486,226 B2 | 11/2002 | Al-Akhdar et al. | |
| 6,557,734 B2 | 5/2003 | Buazza et al. | |
| 6,632,535 B1 | 10/2003 | Buazza et al. | |
| 6,634,879 B2 | 10/2003 | Buazza et al. | |
| 6,641,261 B2 | 11/2003 | Wang et al. | |
| 6,770,692 B1 | 8/2004 | Kobayashi et al. | |
| 6,777,459 B2 | 8/2004 | Al-Akhdar et al. | |
| 6,926,510 B2 | 8/2005 | Buazza et al. | |
| 6,939,899 B2 | 9/2005 | Buazza et al. | |
| 6,960,312 B2 | 11/2005 | Powers et al. | |
| 6,964,479 B2 | 11/2005 | Buazza et al. | |
| 7,044,429 B1 | 5/2006 | Foreman et al. | |
| 7,079,920 B2 | 7/2006 | Buazza et al. | |
| 7,144,598 B2 | 12/2006 | Moravec et al. | |
| 7,169,702 B2 | 1/2007 | El-Hibri | |
| 7,217,440 B2 | 5/2007 | Jallouli et al. | |
| 7,278,737 B2 | 10/2007 | Mainster et al. | |
| 8,004,764 B2 | 8/2011 | Artsyukhovich et al. | |
| 8,106,108 B2 | 1/2012 | Chen | |
| 8,133,414 B2 | 3/2012 | Gallas et al. | |
| 8,469,512 B2 | 6/2013 | Croft et al. | |
| 8,541,526 B2 | 6/2013 | Jethmalani et al. | |
| 9,057,887 B1 | 6/2015 | Jaglan | |
| 2003/0156080 A1 * | 8/2003 | Koike | G02B 1/116 345/60 |
| 2006/0019114 A1 | 1/2006 | Thies et al. | |
| 2009/0120874 A1 | 5/2009 | Jensen et al. | |
| 2009/0141357 A1 | 6/2009 | Kamura et al. | |
| 2009/0189303 A1 | 7/2009 | Diggins et al. | |
| 2010/0014144 A1 | 1/2010 | Ota | |
| 2011/0116162 A1 * | 5/2011 | Tsujimura | H04N 5/23212 359/359 |
| 2012/0019767 A1 | 1/2012 | Cadet et al. | |
| 2012/0019915 A1 | 1/2012 | Yan et al. | |
| 2012/0057236 A1 * | 3/2012 | Broadway | C03C 17/3435 359/586 |
| 2013/0216807 A1 | 8/2013 | Wakefield et al. | |
| 2013/0222913 A1 | 8/2013 | Tomoda et al. | |
| 2015/0131047 A1 | 5/2015 | Saylor et al. | |
| 2015/0334824 A1 * | 11/2015 | Fix | H05K 3/4664 174/257 |
| 2016/0274276 A1 | 9/2016 | Brown et al. | |
| 2017/0102489 A1 | 4/2017 | Brown et al. | |

FOREIGN PATENT DOCUMENTS

| | | |
|---|---|---|
| EP | 3362826 | 4/2017 |
| JP | 2011232569 A | 11/2011 |
| WO | WO2016/149644 A1 | 9/2016 |
| WO | WO2017/0066473 A1 | 4/2017 |

OTHER PUBLICATIONS

Gracia et al., SiO2/TiO2 thin films with variable refractive index prepared by ion beam induced and plasma enhanced chemical vapor deposition. Thin Solid Filmc 600. Dec. 16, 2005. Retrieved from internet: <http://sincaticmse.csic.es/articulosiTSF2006_500_19_gracia.pdf> p. 19.

European Patent Office, Supplementary European Search Report dated Sep. 27, 2018 in European Patent Application No. 16762460, 30 pages.

* cited by examiner

| Samples | $P_O$ (kV) | $P_{max}$ (kV) | $P_1$ (kV) | $\Delta P$ (kV) |
|---|---|---|---|---|
| Average Control Sample | -0.04 | -5.98 | -4.00 | -3.96 |
| Standard Deviation | 0.08 | 0.84 | 0.61 | 0.62 |
| Average Test Sample | -0.01 | -0.08 | -0.03 | -0.02 |
| Standard Deviation | 0.03 | 0.06 | 0.03 | 0.02 |

ANTI-STATIC, ANTI-REFLECTIVE COATING

RELATED APPLICATIONS

This application claims priority to U.S. Provisional Application Ser. No. 62/130,502 filed Mar. 9, 2015 entitled Anti-Static Anti-Reflective Coating, which is hereby incorporated herein by reference in its entirety.

FIELD OF THE INVENTION

The present invention relates to coatings for optical articles and, more particularly, to coatings that impart anti-static and anti-reflective characteristics to optical articles.

BACKGROUND OF THE INVENTION

Anti-static coatings function by providing an electrical pathway to neutralize accumulated static charge on the surface of an insulating substrate. In certain applications, the pathway may be a conductive surface or coating formed upon a surface of the substrate. In the field of ophthalmic lenses, the substrate may, for example, be a polycarbonate or a casting resin or monomer, and the anti-static coating functions to neutralize a static charge across the optical surface of the lens. Neutralizing the static charge prevents or decreases the static attraction of lint, dust, debris, and other particulates to the surface of the lens. Hence, the anti-static coating aids in the cleanliness and ultimate optical clarity of the lens.

Anti-reflective, or AR, coatings are another type of coating that is employed on ophthalmic lenses. Anti-reflective coatings reduce reflection off the front and/or back surface of ophthalmic lenses and therefore are desirable for creating eyeglasses with improved light transmission, visibility, and aesthetics. Typically, such anti-reflective coatings are applied as a series of layers of different materials having different refractive indices. This system of layers is often referred to as a "stack."

Anti-reflective coatings are typically applied to optical surfaces through physical vapor deposition techniques and machines, such as sputter coating systems and machines. One drawback to the use of sputter coating machines is that, due to physical constraints within the machines, sputter coating systems can be limited in the number of different targets employed in the system, i.e. limited in the number of different materials that can be concurrently applied in a coating system. For example, it is common for sputter coating machines to be operable to employ only two different targets and, hence, sputter coat only two different materials at a time; one material for a high refractive index dielectric and one material for a low or mid index dielectric. Hence, conventional sputter coating machines may not be able to sputter coat both the desired high and low refractive materials, as well as a conductive material that will function for providing anti-static properties to the lens.

In order to form coatings that impart both anti-static and anti-reflective characteristics, sputter coating applications have been developed in which high refractive index transparent conductive oxides such as indium tin oxide, ITO, and tin-oxide are employed as one of the two target materials in the sputter coating system and are thereby incorporated into the anti-reflective coating stack. Such applications are discussed in U.S. Pat. No. 6,852,406 herein incorporated by reference in its entirety. However, for many coating application ITO targets are expensive and also prone to problems such as thermal induced cracking. Thermal induced cracking disadvantageously limits the attainable power and therefore deposition rate and cycle time when using ITO targets in sputter coating systems. Furthermore, small footprint or scale sputter coaters that are suitable for relatively small prescription laboratory environments are limited to one or two targets for both the high and low index materials. It is undesirable to use ITO as the high index material for the above mentioned reasons of cost and fragility. Moreover, other high index materials such as zirconium dioxide and titanium dioxide provide better performance in terms of refractive index and low absorption. For lens manufacturers and eye glass producers, these disadvantages are economically and practically problematic for cost effectively producing lenses that have both anti-static and anti-reflective properties.

What is needed in the art is a coating system and method that imparts both anti-static and anti-reflective properties on to an optical surface while minimizing the number of different coating materials required and/or the necessity of employing costly and problematic transparent conductive oxide such as indium tin oxide.

OBJECTS AND SUMMARY OF THE INVENTION

The present invention provides coating systems and methods that impart both anti-static and anti-reflective properties on to an optical surface while minimizing the number of different target materials required and/or the necessity of employing costly and problematic transparent conductive oxide target materials. These objectives are achieved, in part, by providing a coating system incorporating alternating layers of low, mid, and/or high refractive index oxide materials and one or more layers of conductive, substantially non-oxide forms of the same target materials employed to form the alternating layers of low, mid, and/or high refractive index oxide materials. For example, an anti-reflective, anti-static optical coating according to the present invention comprises a plurality of alternating layers of an oxide form of a first material and an oxide form of a second material; and an electrically conductive layer formed of either the first material or the second material. These objectives are further achieved, in part, by manipulating a thickness and/or a quantity of such conductive, substantially non-oxide, opaque layers below, on top of, or within alternating layers of low, mid, and/or high refractive index oxide materials of the coating system.

These objectives are further achieved, in part, by providing an anti-reflective, anti-static optical lens comprising: an optical substrate; a plurality of layers of an oxide form of a first material applied over a surface of the optical substrate; a plurality of layers of an oxide form of a second material applied over the surface of the optical substrate, at least one layer of the plurality of layers of the oxide form of the second material interposed between two layers of the plurality of layers of the oxide form of the first material; and an electrically conductive layer of the first material applied over the surface of the optical substrate.

These objectives are further achieved, in part, by providing a method for forming an anti-reflective, anti-static optical coating comprising forming a plurality of alternating layers of an oxide form of the first material and an oxide form of a second material, and forming an electrically conductive layer of the first material on a surface of one of the plurality of alternating layers.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
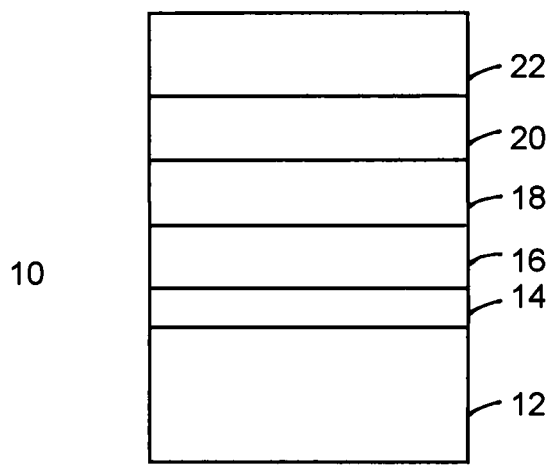
FIG. 1 is a cross-sectional view of an optical article employing a coating according to one embodiment of the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Broadly speaking, the present invention provides coating systems and methods that impart both anti-static and anti-reflective properties on to an optical surface while minimizing the number of different target materials required and/or the necessity of employing costly and problematic transparent conductive oxide target materials. These objectives are achieved, in part, by providing a coating system incorporating alternating layers of low, mid, and/or high refractive index oxide materials and one or more layers of conductive, substantially non-oxide forms of the same target materials employed to form the alternating layers of low, mid, and/or high refractive index oxide materials. These objectives are further achieved, in part, by manipulating the thickness and/or the quantity of such conductive, substantially non-oxide layers below, on top of, or within the alternating layers of low, mid, and/or high refractive index oxide materials of the coating system.

In certain embodiments, the coating system of the present invention imparts anti-reflective properties, in part, by employing alternating transparent layers of low, mid, and high refractive index materials. In this regard, high refractive index means an index of refraction that is approximately greater than about 1.9 at a referenced wavelength, for example a wavelength of about 550 nanometers. Low refractive index means an index of refraction that is approximately less than about 1.5 at a referenced wavelength, for example a wavelength of about 550 nanometers. Mid refractive index means an index of refraction approximately between about 1.5 and 1.9 at a referenced wavelength, for example a wavelength of about 550 nanometers. Low refractive index materials include, for example, silicon dioxide. Mid refractive index materials include, for example, silicon oxynitride or aluminum oxide, and high refractive index materials include, for example, titanium dioxide, tantalum pentoxide, and zirconium dioxide.

According to certain embodiments of the present invention, as shown in FIG. 1, a lens or optical article 10 has a coating imparting anti-reflective properties, i.e. an anti-reflective stack. For the sake of clarity, the coatings or stacks disclosed herein will be described from the bottom up. That is to say the various layers of the coating or stack will be described starting from a first or bottom layer of the stack that is applied directly to an optical substrate and proceeding sequentially with each subsequent layer of the stack applied. In this manner, a "top layer" of the coating or stack is the last layer of the relevant coating or stack applied during the coating process.

An anti-reflective stack according to the present invention has, for example, an adhesive layer 14 applied directly to a surface of an optical substrate 12. A first high refractive index layer 16 is applied directly on top of the adhesive layer 14. A first low refractive index layer 18 is applied directly on top of the first high refractive index layer 16. A second high refractive index layer 20 is applied directly on top of the first low refractive index layer 18, and a second low refractive index layer 22 is applied directly on top of the second high refractive index layer 20. The adhesive layer 14 is, for example, formed of a silicon oxide, $SiO_x$ where x is less than or equal to two; zirconium; and/or a zirconium oxide, $ZrO_x$ where x is less than or equal to two and has, for example, a thickness of approximately 1 nanometer or less.

The first high refractive index layer 16 is, for example, formed of zirconium dioxide and has a thickness of approximately 5 to 15 nanometers, for example, 13 nanometers. The first low refractive index layer 18 is, for example, formed of silicon dioxide and has a thickness of approximately 20 to 40 nanometers, for example, 30.2 nanometers. The second high refractive index layer 20 is, for example, formed of zirconium dioxide and has a thickness of approximately 100 to 150 nanometers, for example, 121.5 nanometers. The second low refractive index layer 22 is, for example, formed of silicon dioxide and has a thickness of approximately 60 to 100 nanometers, for example, 81.7 nanometers.

It will be appreciated that the above-described stack is only one example of an anti-reflective stack according to the present invention and that variations in the number of the layers, the individual thickness of the different layers, and the various materials from which the different layers are formed are contemplated and within the scope of the present invention. Furthermore, the lens 10 may further employ additional functional coatings and treatments applied over or on top of the anti-reflective stack, for example, easy-cleaning and/or hydrophobic coatings. In certain embodiments of the present invention, the adhesive layer 14 is omitted from the coating stack.

For ophthalmic applications, in certain embodiments, a separate hydrophobic or anti-fouling layer or coating may be applied on top of the above-described alternating layers of low, mid, and high refractive index materials. This hydrophobic or anti-fouling layer or coating provides for easier cleaning and maintenance of the ophthalmic lens. For sputter applied films, a hydrophobic or anti-fouling layer or coating is typically applied by a dip process which achieves a low surface energy on the coating, i.e. achieves a water contact angle greater than 100 degrees. Such hydrophobic or anti-fouling layer or coating have a thickness in the range of approximately five to ten nanometers.

In order to achieve the desired anti-static properties to the lens or optical article 10, according to the present invention, one or more conductive layers are incorporated into the above-described anti-reflective stack. The one or more conductive layers may be formed of an opaque metalloid semiconductor material such as silicon or a transition metal material such as zirconium. If a plurality of conductive layers are employed, the individual conductive layers may be formed of the same or different materials. In the present invention, these additional conductive layers are advantageously derived from the same target materials used to form the above-described different dielectric layers of the anti-reflective stack.

For example, in certain embodiments, a silicon target or a silicon doped target is employed to form the low refractive index silicon dioxide layers within the coating stack, as well as to deposit one or more electrically conductive silicon layers under, within, and or on top of the low, mid, and high refractive index layers of the coating. In certain embodiments, a zirconium target or a zirconium alloy target is employed to form the high refractive index zirconium dioxide layers within the coating stack, as well as to deposit one or more electrically conductive zirconium layers under, within, and/or on top of the low, mid, and high refractive index layers of the coating.

Figure 2:
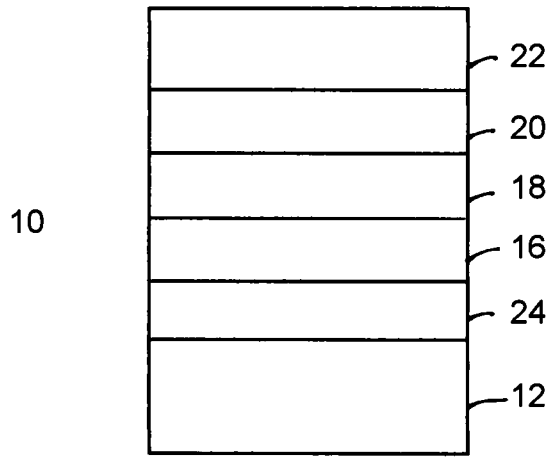
FIG. 2 is a cross-sectional view of an optical article employing a coating according to one embodiment of the present invention.

In one embodiment of the present invention, as shown in FIG. 2, the thickness of the adhesive layer 14, shown in FIG. 1, is manipulated, for example the thickness is increased, so as to form a conductive adhesive layer 24 having a desired degree of conductivity. The conductive adhesive layer 24 is, for example, formed of silicon or zirconium that is partially oxidized during the application process but that maintains enough metallic phase to provide the necessary electrical conductivity. The conductive adhesive layer 24 has a thickness of approximately 2 to 12 nanometers or approximately 4 to 9 nanometers.

Figure 3:
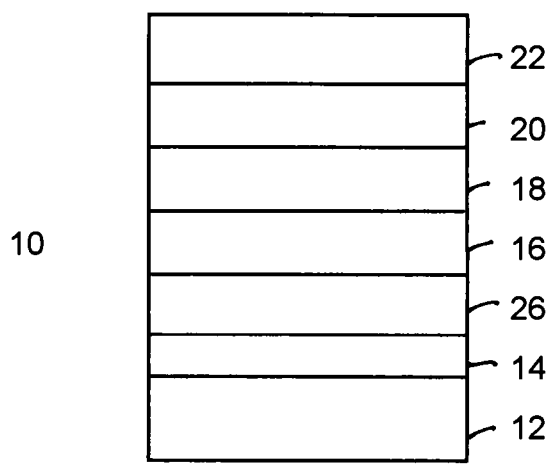
FIG. 3 is a cross-sectional view of an optical article employing a coating according to one embodiment of the present invention.

In one embodiment of the present invention, as shown in FIG. 3, a conductive layer 26 is formed on top of the adhesive layer 14 and below the first high refractive index layer 16. In this embodiment, the adhesive layer 14 and the conductive layer 26 may be formed from the same target material or from different target materials. For example, the adhesive layer 14 may be formed of silicon oxide, $SiO_x$ where x is less than or equal to two, i.e. a substoichiometric oxide non-conductive suboxide, and the conductive layer 26 may be formed of zirconium. The conductive layer 26 has, for example, a thickness of approximately 2 to 12 nanometers or approximately 4 to 9 nanometers.

Figure 4:
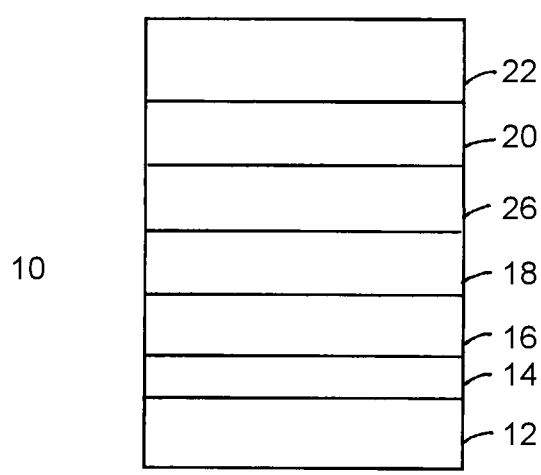
FIG. 4 is a cross-sectional view of an optical article employing a coating according to one embodiment of the present invention.

In one embodiment of the present invention, as shown in FIG. 4, the conductive layer 26 is formed on top of the first low refractive index layer 18 and below the second high refractive index layer 20. The conductive layer 26 has, for example, a thickness of approximately 2 to 12 nanometers or approximately 4 to 9 nanometers. The conductive layer 26 may, for example, be formed of silicon or zirconium.

Figure 5:
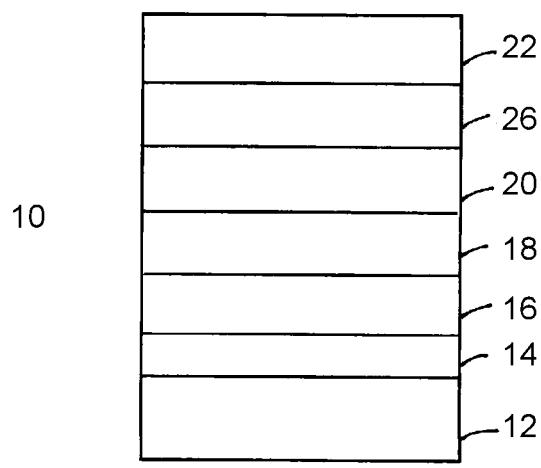
FIG. 5 is a cross-sectional view of an optical article employing a coating according to one embodiment of the present invention.

In one embodiment of the present invention, as shown in FIG. 5, the conductive layer 26 is formed on top of the second high refractive index layer 20 and below the second low refractive index layer 22. The conductive layer 26 has, for example, a thickness of approximately 2 to 12 nanometers or approximately 4 to 9 nanometers. The conductive layer 26 may, for example, be formed of silicon or zirconium.

Figure 6:
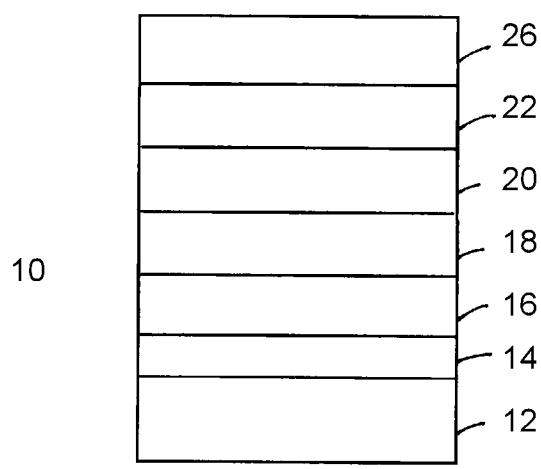
FIG. 6 is a cross-sectional view of an optical article employing a coating according to one embodiment of the present invention.

In one embodiment of the present invention, as shown in FIG. 6, the conductive layer 26 is formed on top of the alternating layers of low, mid, and high refractive index layers, for example, on top of the second low refractive index layer 22. The conductive layer 26 has, for example, a thickness of approximately 2 to 12 nanometers or approximately 4 to 9 nanometers. The conductive layer 26 may, for example, be formed of silicon or zirconium.

The thickness of the above-described conductive adhesive layer 24 and/or conductive layer 26 is sufficient to provide adequate electrical conductivity while being thin enough to provide adequate transmission. Depending upon application and product design, such transmission can be greater than 85 percent and preferably above 95 percent. For example, testing showed that a silicon layer less than one nanometer thick does not provide adequate conductivity; a silicon layer near, approximately, or substantially three nanometers thick provides adequate conductivity and transmission; while a silicon layer greater than ten nanometers thick provides adequate conductivity but results in too large of a reduction in transmission for clear ophthalmic lens applications. A specific thickness between one and ten nanometers will depend upon the stack design and the desired transmission.

In certain embodiments, multiple conductive layers are employed within a single coating system. For example, a plurality of conductive layers 26 may be employed within the coating system of the present invention. The individual conductive layers 26 of the plurality of the conductive layers 26 are applied separately under, between, and/or on top of the alternating layers of low, mid, and high refractive index layers. Alternatively, the coating of the present invention may employ the conductive adhesive layer 24 in combination with one or more of the conductive layers 26.

In certain embodiments, in order to achieve the desired transmission, reflectance, absorbance, color, and/or conductivity of an anti-reflective, anti-static coating according to the present invention employing a conductive layer or layers as described above, the thickness and/or number of alternating dielectric layers of low, mid, and high refractive index materials are manipulated.

In certain embodiments, rather than a single conductive layer 26 disposed between layers of low, mid, and/or high refractive index oxide materials or a conductive adhesive layer 24, a plurality of conductive layers 26 and/or conductive adhesive layer 24 are employed. In such embodiments, a maximum transmittance through the coating that is greater than that possible with a single layer of equivalent conductance can be achieved.

The inventors have discovered that as a thickness of an absorbing conductive layer increases the anti-static properties imparted by the conductive layer also increase and the transmission of light through the conductive layer decreases. Accordingly, in certain embodiments of the coating system of the present invention, a single conductive layer has a thickness in the range of approximately 1 to 10 nanometers. At a conductive layer thickness of less than 1 nanometer, the anti-static properties are diminished and at a thickness greater than 10 nanometers, transmittance of the coating system diminishes to undesirable levels.

In certain embodiments of the present invention, the optical, static dissipation, and robustness of the coating is improved by inserting additional conductive layers within the coating system of the present invention. For example, additional conductive layers can be inserted into the coating stack to provide increased conductance and/or to modify the coating's properties of, for example, abrasion resistance and improved resistance to degradation in humidity.

For example, in one embodiment of a coating method according to the present invention a plastic lens is coated using a sputter tool designed with a small footprint suitable for use in a small prescription processing lab. Aspects of such a sputter system are detailed in the assignee's U.S. Publication No. 2014/0174912 which is herein incorporated by reference in its entirety. The relatively small footprint of such a machine limits the number of sputter targets, or materials, to a maximum of two. The targets are formed of metallic-type materials and oxygen is added during processing to form the desired transparent dielectric layers of low, mid, and/or high refractive index oxide materials. One target is used to form a low index material, such as silicon dioxide, from a silicon target exposed to oxygen gas. The other target is used to form a high index material, such as zirconium dioxide, from a zirconium target exposed to oxygen gas. A plasma source in the system provides an activated oxygen plasma to assist in the formation of the absorption free oxide layers.

At the start of the sputter process, the lens to be coated is transferred into the coating chamber. At a chosen pressure, typically below $5 \times 10^{-5}$ mbar a mixture of argon, and oxygen are passed into the chamber by mass flow controllers. The plasma source is energized to form a plasma in order to treat the lens surface increasing the adhesion of deposited film material to the lens. Following plasma cleaning, an adhesion layer of silicon is deposited at an argon flow of 40 standard cubic centimeters per minute, SCCM, and a power of 1500 watts. No oxygen is added into the process which allows the formation of a silicon film with minimal oxygen incorporation. The thickness of this layer is set by the deposition time. Typically a film thickness of less than one nanometer is deposited. If a layer thickness of three nanometers or greater is deposited the film is sufficiently conductive to impart antistatic properties. For antistatic applications, an important step between the plasma clean and the adhesion layer deposition is to provide a sufficient wait time to remove residual oxygen from the chamber to allow the formation of a layer with the desired conductive properties. On top of this layer alternating layers of low and high index material are deposited to prescribed thicknesses using a suitable process such as pulsed direct current reactive sputtering.

The low and high index materials are deposited at powers sufficient to achieve the desired cycle time while not causing unwanted heating of the lens. A typical power level is 1458 watts for a target approximately six inches in diameter. For the silicon dioxide film formation from a silicon target, 16 SCCM of oxygen is added to the plasma source running a discharge current of 300 milliamps at a voltage of near 250. Argon is supplied to the sputter head at a flow rate of 10 SCCM. The result is a high quality transparent silicon dioxide film using a process compatible with most plastic lenses. For the zirconium dioxide film formation from a zirconium target, 20 SCCM of oxygen is added to the plasma source running a discharge current of 300 milliamps at a voltage of near 250. Argon is supplied to the sputter head at a flow rate of 20 SCCM. The result is a high quality transparent zirconium dioxide film formed from a process compatible with most plastic lenses. The individual layer thicknesses are set by the coating design, as understood by anyone skilled in the art. These thicknesses will vary depending upon the desired design and the number of layers may vary, typically between four and seven, with the total coating thickness of between 200 and 500 nanometers. The process conditions described above provide an example for reference only and may vary depending upon the materials employed, the desired film properties, and the coating machine employed.

In certain embodiments, the coating system of the present invention is formed and optimized for specific applications by manipulating the deposition conditions employed in forming the coating system. For example, deposition conditions of each of the different target materials is varied to achieve the desired reflectance, transmission, absorbance, and anti-static properties of the resulting coating system.

It will be appreciated that deposition conditions or parameters are numerous for different sputtering techniques and machines, and meaningful deposition parameters and/or figures can often only be supplied for one given deposition system or machine. Accordingly, for any given system, a skilled operator will appreciate that it will be necessary to determine the variation of the desired properties of a coating as a function of the specific deposition conditions of the deposition machine employed. The system parameters that may alter from one machine to the next include: the geometry of the deposition chamber, the target size, the power applied to the target, the target voltage, the distance between the substrate and the target, the target composition, gas flow-rates, pumping speed, total pressures, and the like.

In certain embodiments, coatings according to the present invention are applied to optical substrates and articles, for example, ophthalmic lenses, windows, safety goggles, shields, and sun glasses. The coating system of the present invention is applied to a front, a back or a front and back surface of the optical article. The ophthalmic lenses may, for example, be a finished or unfinished lens and/or a single or multifocal lens. The optical article can, for example, be formed of glass, crystalline quartz, fused silica, or soda-lime silicate glass. In an alternative embodiment, the optical article is formed of a plastic bulk material or resin suitable for cast or injection molding. For example, such materials include polymers based on allyl diglycol carbonate monomers (such as CR-39 available from PPG Industries, Inc. and SPECTRALITE and FINALITE Sola International Inc.) and polycarbonates (such as LEXAN available from General Electric Co.).

Such optical articles may be transparent or may employ an active or static coloring substrate mixed directly into the bulk material or resin. Such optical articles may further employ additional functional characteristics in the form of coatings, laminates, thin film inserts, and/or thin film laminates. The functional attributes of such films, laminates, or coatings may include, for example, coloration, tinting, hard coating, polarization, photochromism, electrochromism, UV absorption, narrow band filtering, and easy-cleaning.

EXAMPLES

In order to evaluate the efficacy of the present invention, six control sample lenses were prepared, each having a coating formed of alternating dielectric layers of low, mid, and/or high refractive index materials but not employing a conductive layer or conductive adhesive layer. Six test sample lenses were prepared with an anti-static, anti-reflective coating according to the present invention, i.e. were prepared with a coating formed of alternating dielectric layers of low, mid, and/or high refractive index materials and one or more conductive and/or conductive adhesive layers. The control sample lenses were formed according to the design shown in FIG. 1 and had a total of four layers of high and low refractive index materials. The test sample lenses were formed according to the design shown in FIG. 2 and had a conductive adhesive layer formed of zirconium.

Figures 7, 8:
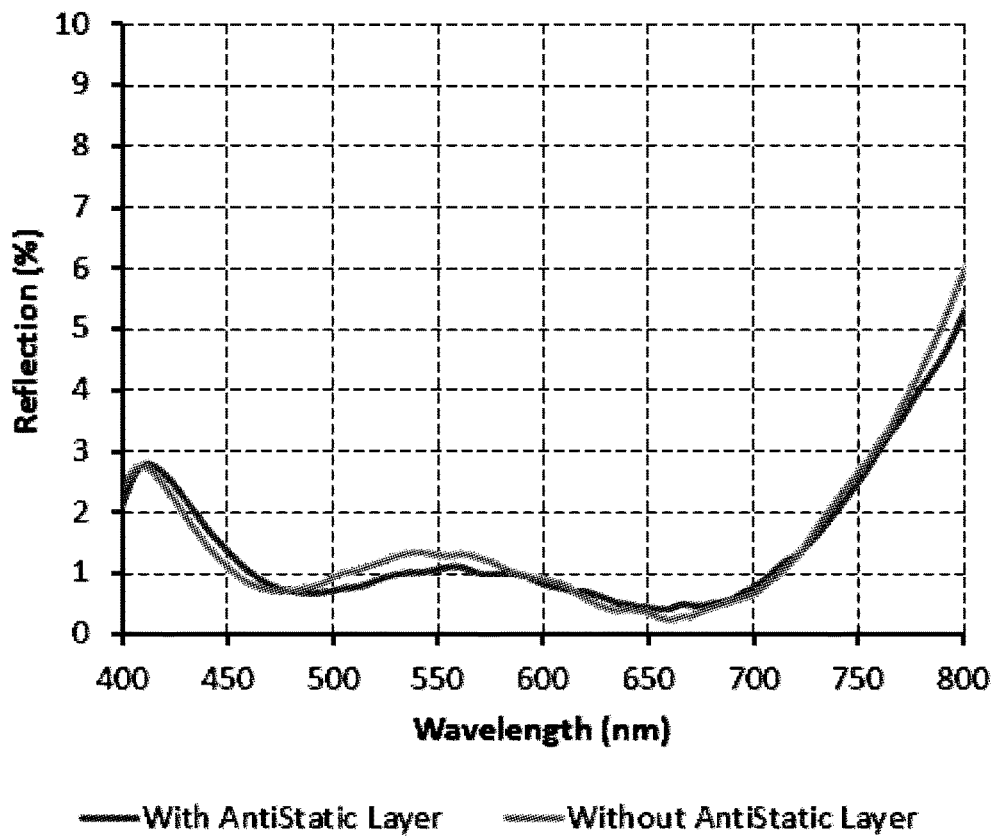
FIG. 7 is a table showing the efficacy of a coating according to one embodiment of the present invention.
FIG. 8 is a graph showing reflection curves for coated lenses according to one embodiment of the present invention.

Voltage measurements were obtained for each sample (1) prior to rubbing the sample lens surface with a cloth (Po); (2) five seconds after rubbing the sample lens surface with a cloth (Pmax); and (3) 30 seconds after rubbing the sample lens surface with a cloth (P1). The residual voltage (ΔP) of the samples was determined as the difference between the measured voltage 30 seconds after rubbing the sample lens surface with a cloth (P1) and prior to rubbing the sample lens surface with a cloth (Po), i.e. ΔP=P1−Po. FIG. 7 shows the results of this study. Testing of the antistatic properties were performed in accordance with SOP L-20-11-03 from Colts Laboratories.

The average residual voltage of the control sample lenses not employing a conductive layer or conductive adhesive layer was approximately minus four (−4) kilovolts. In contrast, the average residual voltage on the surface of the test sample lenses employing one or more conductive and/or conductive adhesive layers according to the present invention was approximately minus twenty (−20) volts. Minus twenty volts was also approximately the minimum measured voltage in the test. The study demonstrates the efficacy of the anti-static properties imparted by the anti-reflective, anti-static, coating system of the present invention.

Representative reflection curves for the control and test sample lenses are shown in FIG. 8. As can be seen, the addition of the conductive adhesive layer has minimal effect upon the reflected spectra. Transmittance of the samples was in excess of 95% with and without the conductive layer.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An anti-reflective, anti-static optical coating comprising:
   a plurality of alternating layers of a transparent oxide form of a first material and a transparent oxide form of a second material different from the first material; and
   an electrically conductive layer only comprising a non-oxide form of either the first material or the second material and having a thickness within a range of 2-12 nm;
   wherein the optical coating has a transmittance of approximately 95 percent or greater.

2. The optical coating of claim 1 wherein the oxide form of the first material has a high refractive index.

3. The optical coating of claim 1 wherein the oxide form of the second material has a low refractive index.

4. The optical coating of claim 1 wherein the oxide form of the first material is zirconium dioxide.

5. The optical coating of claim 1 wherein the oxide form of the second material is silicon dioxide.

6. The optical coating of claim 1 wherein the first material is a transition metal.

7. The optical coating of claim 1 wherein the first material is zirconium.

8. The optical coating of claim 1 further comprising an adhesive layer formed of either the first material or the second material.

9. The optical coating of claim 1 wherein the optical coating comprises at least five layers.

10. An anti-reflective, anti-static optical lens comprising:
    an optical substrate;
    a plurality of layers of an oxide form of a first material applied over a surface of the optical substrate;
    a plurality of layers of an oxide form of a second material applied over the surface of the optical substrate, at least one layer of the plurality of layers of the oxide form of the second material interposed between two layers of the plurality of layers of the oxide form of the first material; and
    an electrically conductive layer consisting of an elemental or an alloy form of the first material or of the second material applied over the surface of the optical substrate and having a thickness within a range of 2-12 nm;
    wherein the optical coating has a transmittance of approximately 95 percent or greater.

11. The optical lens of claim 10 wherein the optical substrate is a cast resin.

12. The optical lens of claim 10 wherein the first material is a transition metal or a metalloid.

13. A method for forming an anti-reflective, anti-static optical coating comprising:
    transferring a substrate into a deposition chamber;
    forming a plurality of alternating layers of an oxide form of a first target and an oxide form of a second target different from the first target on the substrate by reactive sputter deposition in the deposition chamber; and
    forming an electrically conductive layer with a thickness within a range of 2-12 nm, a transmittance of approximately 95 percent or greater, and being composed of only a non-oxide form of the first target or the second target on a surface of one of the plurality of alternating layers by non-reactive sputter deposition in the deposition chamber.

14. The method for forming an anti-reflective, anti-static optical coating of claim 13 further comprising applying an adhesive layer formed of either the first material or the second material directly on a surface of the optical substrate.

15. The method for forming an anti-reflective, anti-static optical coating of claim 13 further comprising forming at least a total of five layers.

16. The method for forming an anti-reflective, anti-static optical coating of claim 14 wherein the adhesive layer is electrically conductive.

17. The method for forming an anti-reflective, anti-static optical coating of claim 13 wherein forming the plurality of alternating layers of the oxide form of the first material and the oxide form of the second material comprises forming high, mid, or low refractive index layers.

18. The method for forming an anti-reflective, anti-static optical coating of claim 13 wherein forming the electrically conductive layer of the first target or the second target on the surface of one of the plurality of alternating layers comprises forming a zirconium layer.

19. The method for forming an anti-reflective, anti-static optical coating of claim 13 wherein forming the electrically conductive layer of the first target or the second target on the surface of one of the plurality of alternating layers comprises forming a layer having a thickness in the range of approximately 1 to 10 nanometers.

* * * * *